(12) United States Patent
D'Aluisio

(10) Patent No.: US 10,737,740 B2
(45) Date of Patent: Aug. 11, 2020

(54) BICYCLE FRAME AND FRONT FORK ASSEMBLY

(71) Applicant: Specialized Bicycle Components, Inc., Morgan Hill, CA (US)

(72) Inventor: Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 151 days.

(21) Appl. No.: 15/777,364

(22) PCT Filed: Oct. 14, 2016

(86) PCT No.: PCT/US2016/057189
§ 371 (c)(1),
(2) Date: May 18, 2018

(87) PCT Pub. No.: WO2017/066678
PCT Pub. Date: Apr. 20, 2017

(65) Prior Publication Data
US 2019/0185100 A1 Jun. 20, 2019

Related U.S. Application Data

(60) Provisional application No. 62/242,480, filed on Oct. 16, 2015.

(51) Int. Cl.
*B62K 19/32* (2006.01)
*B62K 21/02* (2006.01)
(Continued)

(52) U.S. Cl.
CPC ............. *B62K 19/32* (2013.01); *B62K 21/02* (2013.01); *B62K 21/04* (2013.01); *B62K 21/06* (2013.01); *B62K 25/08* (2013.01)

(58) Field of Classification Search
CPC ......... B62K 19/32; B62K 21/02; B62K 21/04
See application file for complete search history.

(56) References Cited

U.S. PATENT DOCUMENTS

| 371,266 A | 10/1887 | Knous |
| 2,687,898 A * | 8/1954 | Schwinn ............... B62K 25/08 |
| | | 280/276 |

(Continued)

FOREIGN PATENT DOCUMENTS

| CN | 202272136 U | 6/2012 |
| CN | 202624540 U | 12/2012 |

(Continued)

OTHER PUBLICATIONS

PCT/US2016/057189 International Search Report and Written Opinion of the International Searching Authority dated Dec. 23, 2016 (14 pages).

(Continued)

*Primary Examiner* — Kevin Hurley
(74) *Attorney, Agent, or Firm* — Michael Best & Friedrich LLP

(57) ABSTRACT

A bicycle according to the present disclosure comprises a frame assembly and a front fork. The frame assembly includes a head tube defining a steering axis. The front fork is rotatably coupled to the head tube and includes upper and lower supports aligned with the steering axis. The upper and lower supports project away from the fork assembly and rotationally couple the front fork assembly to the head tube. A buttress is coupled to the upper and lower supports at upper and lower buttress ends. A pair of laterally spaced fork legs project from the buttress lower end at one end of the fork legs. The buttress is disposed forward of the head tube (Continued)

and has a lateral width which tapers from a first width at the buttress lower end to a second width at the buttress upper end.

20 Claims, 12 Drawing Sheets

(51) Int. Cl.
    *B62K 21/04*     (2006.01)
    *B62K 21/06*     (2006.01)
    *B62K 25/08*     (2006.01)

(56) References Cited

U.S. PATENT DOCUMENTS

| | | | | |
|---|---|---|---|---|
| 4,008,903 A * | 2/1977 | Ramond | ............... | B62K 21/02 |
| | | | | 280/279 |
| 5,305,654 A * | 4/1994 | Durham | ............... | B62K 21/02 |
| | | | | 280/279 |
| 5,429,381 A * | 7/1995 | Mercat | ............... | B62K 19/16 |
| | | | | 280/279 |
| 7,210,694 B2 * | 5/2007 | Trenne | ............... | B62K 21/18 |
| | | | | 188/24.11 |
| 7,571,920 B2 | 8/2009 | Lane | | |
| 7,789,409 B2 | 9/2010 | White | | |
| 7,967,315 B2 * | 6/2011 | Soucek | ............... | B62K 21/02 |
| | | | | 280/274 |
| 7,976,045 B2 * | 7/2011 | Lane | ............... | B62K 19/16 |
| | | | | 280/276 |
| 9,079,631 B1 * | 7/2015 | Costa | ............... | B62K 21/22 |
| 2006/0061057 A1 | 3/2006 | Trenne | | |
| 2009/0283985 A1 | 11/2009 | Lane | | |
| 2010/0253038 A1 | 10/2010 | Soucek et al. | | |
| 2011/0121538 A1 | 5/2011 | Giroux | | |

FOREIGN PATENT DOCUMENTS

| | | |
|---|---|---|
| EP | 2718173 B1 | 9/2016 |
| WO | 2009026721 A1 | 3/2009 |
| WO | 2012/168781 | 12/2012 |

OTHER PUBLICATIONS

European Patent Office Search Report for Application No. 16856345.0-1013 / 3362341 dated Apr. 16, 2019 (7 pages).
European Examination Report for Application No. 16856345.0 dated Feb. 19, 2020 (5 pages).
Intellectual Property Office Action for Taiwanese Application No. 105133471 dated Dec. 13, 2019 (9 pages including English translation).

* cited by examiner

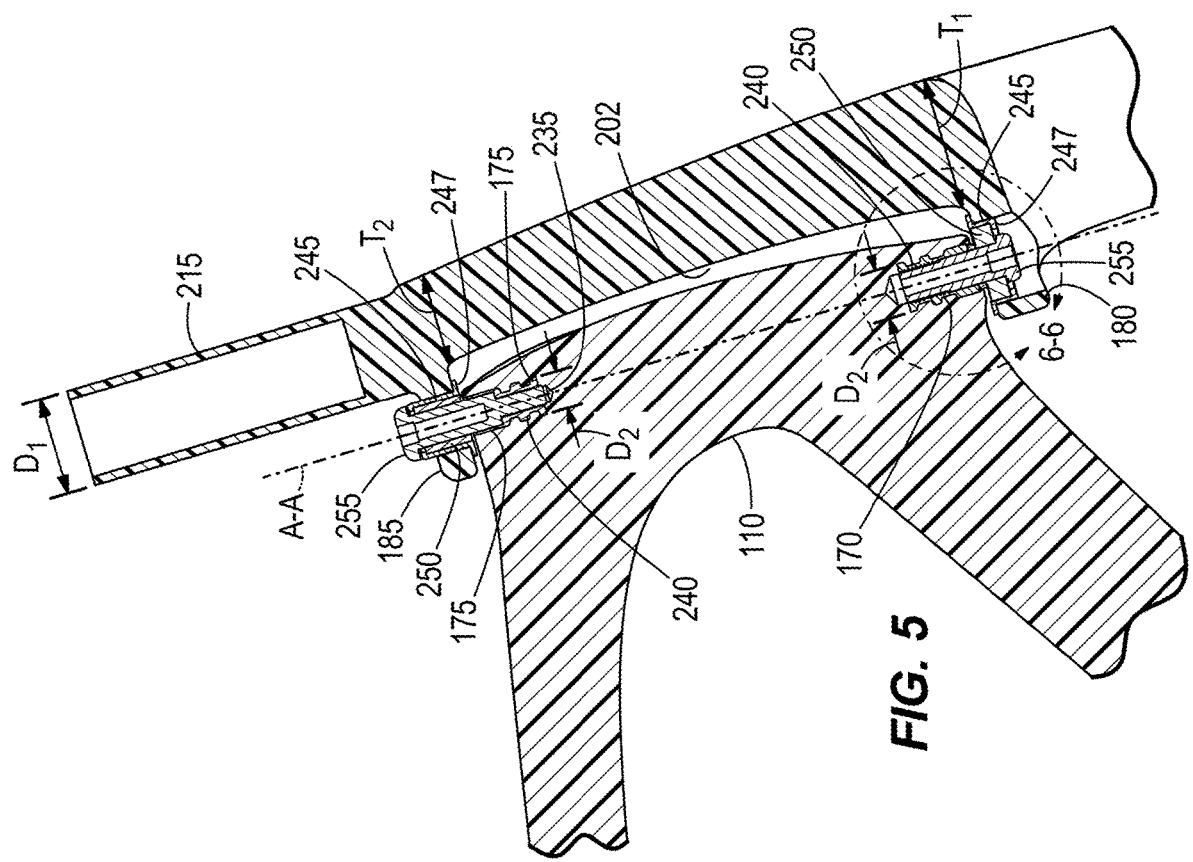
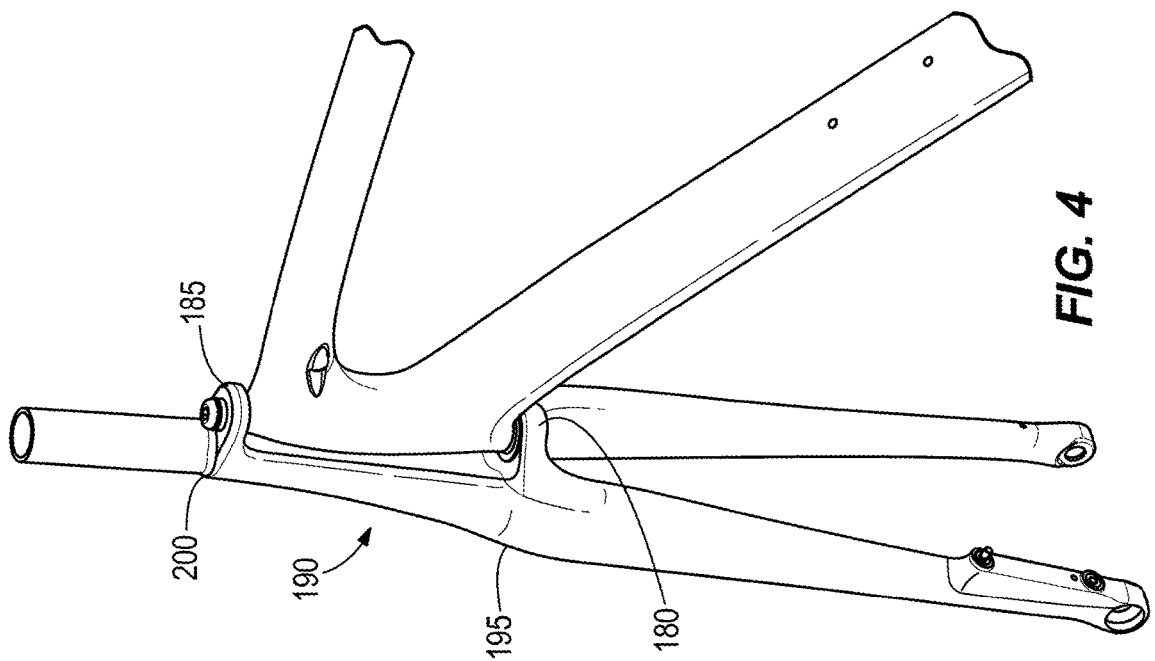

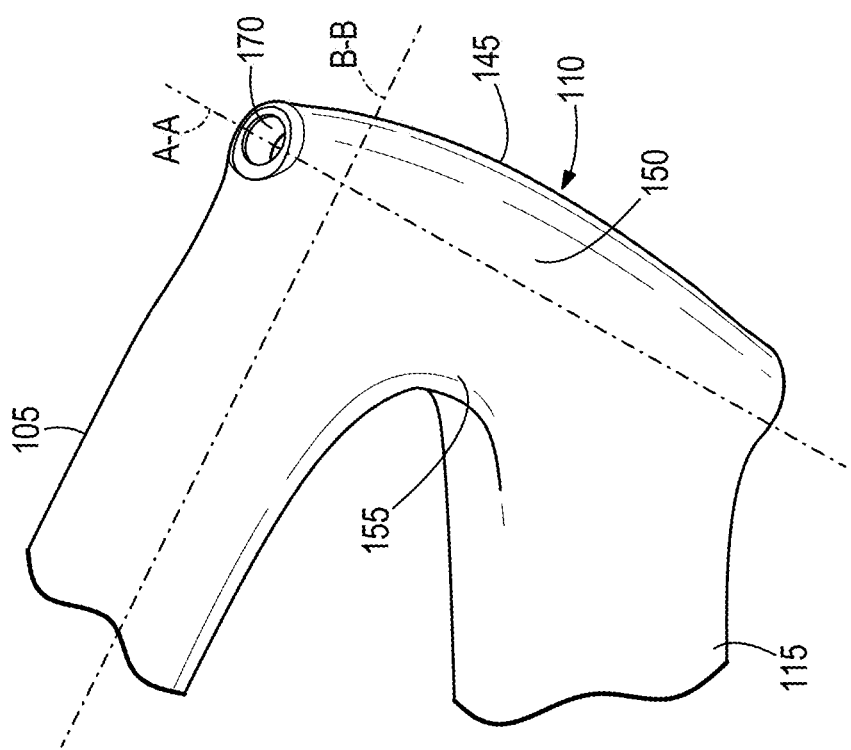
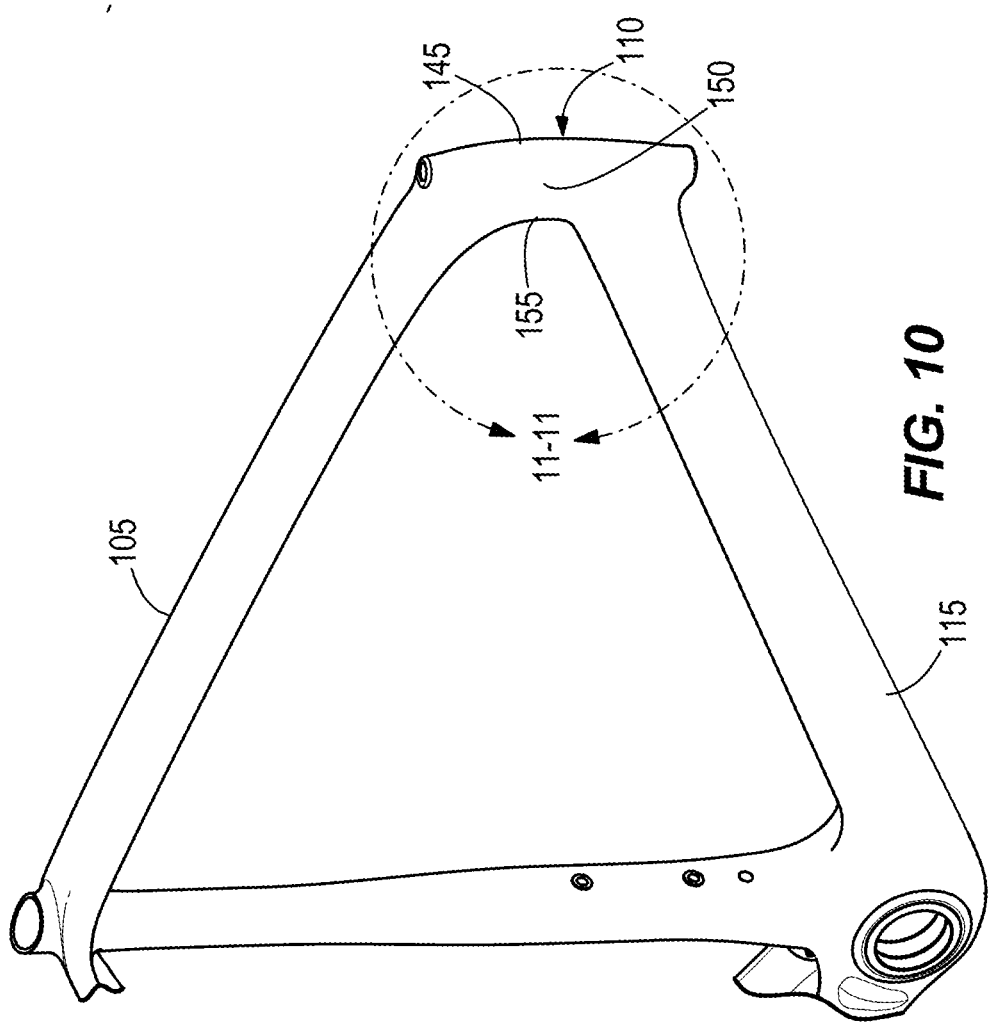

US 10,737,740 B2

BICYCLE FRAME AND FRONT FORK ASSEMBLY

CROSS-REFERENCE TO RELATED APPLICATIONS

This is a U.S. national stage entry of International Patent Application No. PCT/US2016/057189, filed on Oct. 14, 2016, which claims priority to U.S. Provisional Patent Application No. 62/242,480, filed on Oct. 16, 2015, the entire contents of all of which are fully incorporated herein by reference.

BACKGROUND

The present invention relates to bicycle frames, and specifically to bicycle frames and front fork assemblies.

Bicycles commonly have a frame comprising a main frame and a rear triangle. The main frame is typically made from a top tube, a head tube, a down tube, and a seat tube, and the rear triangle is typically made from two chainstays and two seatstays. A front fork is commonly rotationally mounted in the head tube and is secured to handlebars for steering the bicycle. The frame and fork assembly is supported on a front wheel rotationally secured to the fork and a rear wheel rotationally secured to the rear triangle.

Additionally, prior art front fork assemblies 135a require added material to provide lateral stiffness, thereby increasing the weight. Referring to FIG. 9, prior art front fork assemblies 135a have a sharp radius at a juncture between a fork crown 140a and the steerer tube 137a. The steerer tube 137a projects from the fork crown 140a, and has a generally constant width. In order to provide structural strength to prior art front fork assemblies 135a, material is added to the connection between fork legs 145a and the fork crown 140a and between the fork crown 140a and the steerer tube 137a. Thus there is a direct correlation between the amount of lateral stiffness available in prior art front fork assemblies 135a and the amount of material that can be added to these connection points. The added material increases the weight of prior art front fork assemblies 140a, and the amount of stiffness that can be added is limited by the diameter of the tubes used for the front fork legs 145a, the fork crown 140a and the steerer tube 137a.

SUMMARY

The present invention provides an improved bicycle having increased lateral stiffness, improved handling, and decreased weight. The bicycle comprises a frame assembly and a front fork assembly. The frame includes a head tube defining a steering axis. The front fork assembly is coupled to the head tube for rotation about the steering axis and includes upper and lower supports aligned with the steering axis. The upper and lower supports rotationally couple the front fork assembly to the head tube.

A buttress is coupled to the upper and lower supports at first and second buttress ends, respectively, and a pair of laterally spaced fork legs project downward from the buttress first end. The buttress is disposed forward of the head tube and has a lateral width that tapers from a first width at the buttress lower end to a second width at the buttress upper end, the first width being wider than the second width.

Other aspects of the invention will become apparent by consideration of the detailed description and accompanying drawings.

BRIEF DESCRIPTION OF THE DRAWINGS

FIG. 4 is a rear perspective view of a front portion of the frame and front fork assembly of FIG. 1;

FIG. 5 is a section of a front portion of the frame and fork assembly taken along line 5-5 in FIG. 2;

FIG. 10 is a perspective side view of a front portion of the bicycle frame of FIG. 1;

FIG. 11 is an enlargement of the area in FIG. 10 bounded by circle 11-11;

DETAILED DESCRIPTION OF THE PREFERRED EMBODIMENT

Figure 1:
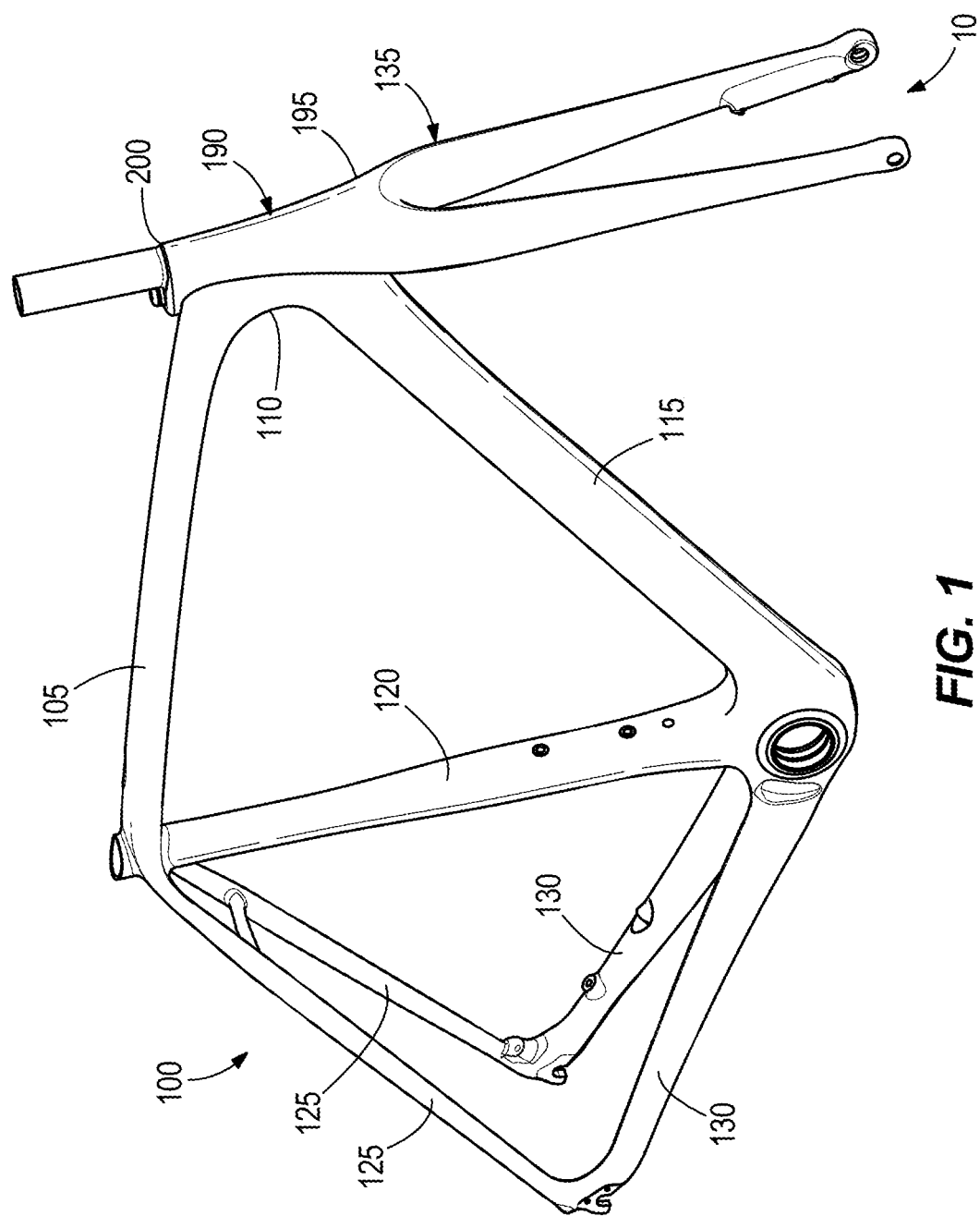
FIG. 1 is a front perspective view of a bicycle frame and front fork assembly embodying the present disclosure.
Figure 3:
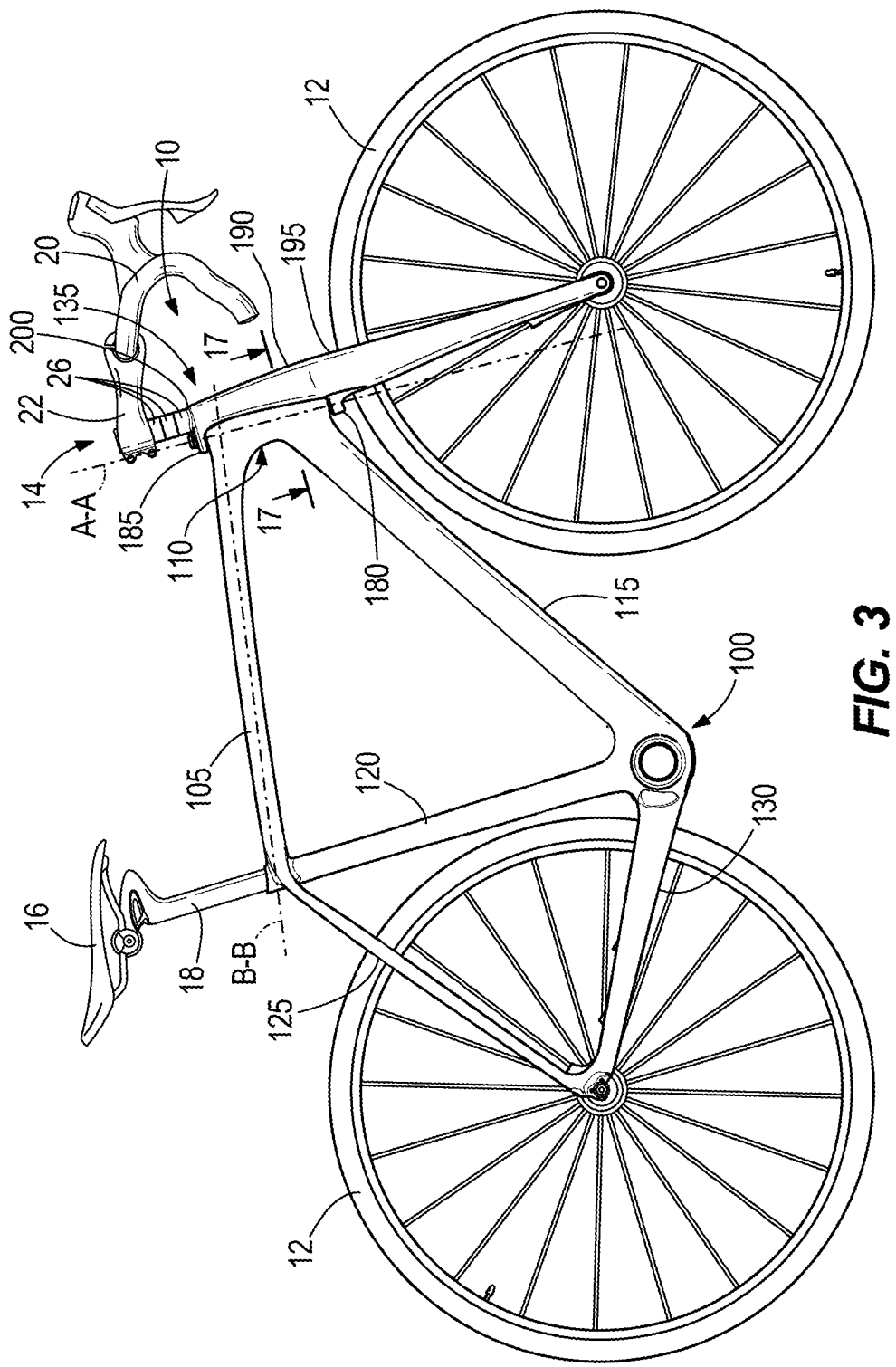
FIG. 3 is a right side view of a complete bicycle including the frame and front fork assembly of FIG. 1.

FIGS. 1 and 3 show a bicycle 10 in accordance with the present disclosure. Referring to FIG. 3, the bicycle 10 includes wheels 12, a steering assembly 14, a saddle 16, a seat post 18 and drivetrain (not shown) as is known in the art. The steering assembly 14 includes a handlebar 20 and a stem 22. With continued reference to FIGS. 1 and 3, the bicycle 10 includes a frame 100 that includes a top tube 105, a head tube 110, a down tube 115, a seat tube 120, a pair of seat stays 125 and a pair of chainstays 130. The top tube 105 and down tube 115 connect the seat tube 120 and head tube 110, however one of ordinary skill in the art will realize that the bicycle frame 100 may be modified such that one of either the top tube 105 or the down tube 115 may be eliminated without departing from the scope of the disclosure. A front fork assembly 135 is rotationally secured to the head tube 110 as will be described in greater detail below.

Figure 12:
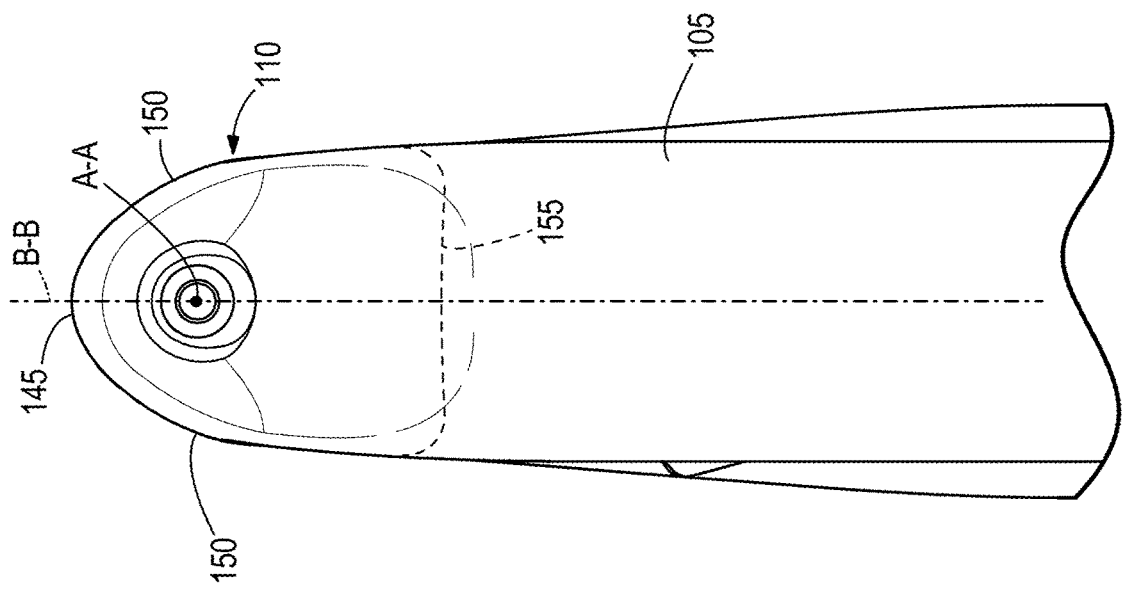
FIG. 12 is a top view of the portion of the bicycle frame of FIG. 11.
Figure 13:
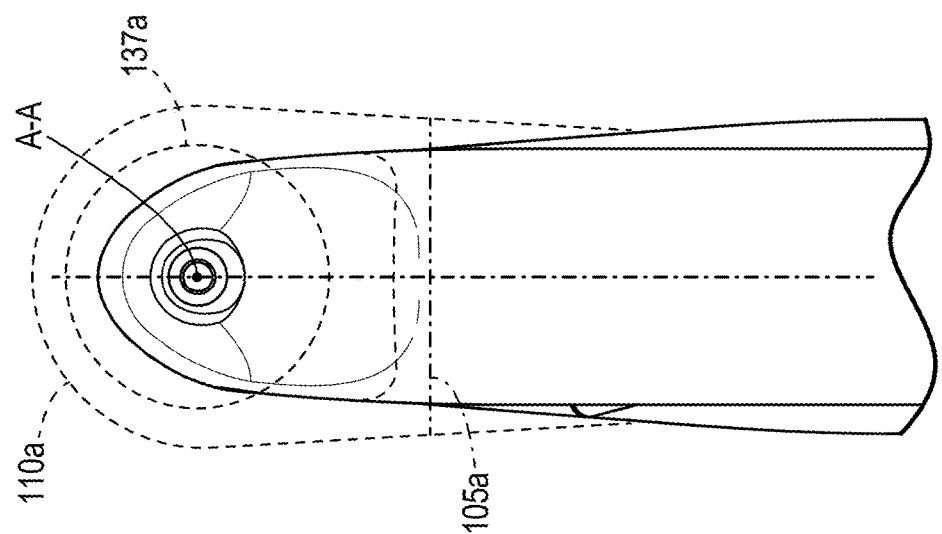
FIG. 13 is the top view of FIG. 12 with the top tube and head tube of a prior art bicycle shown in phantom.

As shown in FIGS. 3 and 11-14, the head tube 110 defines a steering axis A-A about which the front fork assembly 135 rotates. The top tube 105 defines a longitudinal axis B-B, and the top tube and head tube are connected as is known in the art adjacent a rear wall 155 of the head tube 110 (See FIGS. 10 and 12). As best shown in FIGS. 5, 12 and 13, the steering axis A-A is disposed eccentrically within the head tube 110. Referring specifically to FIGS. 10-14, the head tube 110 includes a front wall 145 a pair of sidewalls 150 and the rear wall 155 (shown in phantom in FIG. 12). As best seen in FIGS. 11 and 12, the steering axis A-A is disposed closer to the front wall 145 and the sidewalls 150 than to the rear wall 155.

With continued reference to FIGS. 10-14, the bicycle frame 100 has a width that narrows forward of a plane that is defined at the rear wall 155 of the head tube 110, and in the embodiment shown in FIG. 12, the head tube has a generally bullet-nosed sectional shape. As will be discussed in greater detail below, the configuration of the connection between the front fork assembly 135 and the bicycle frame 100 allows for a narrower head tube 110 forward of the plane defined at the rear wall 155 than prior art bicycles.

Figure 14:
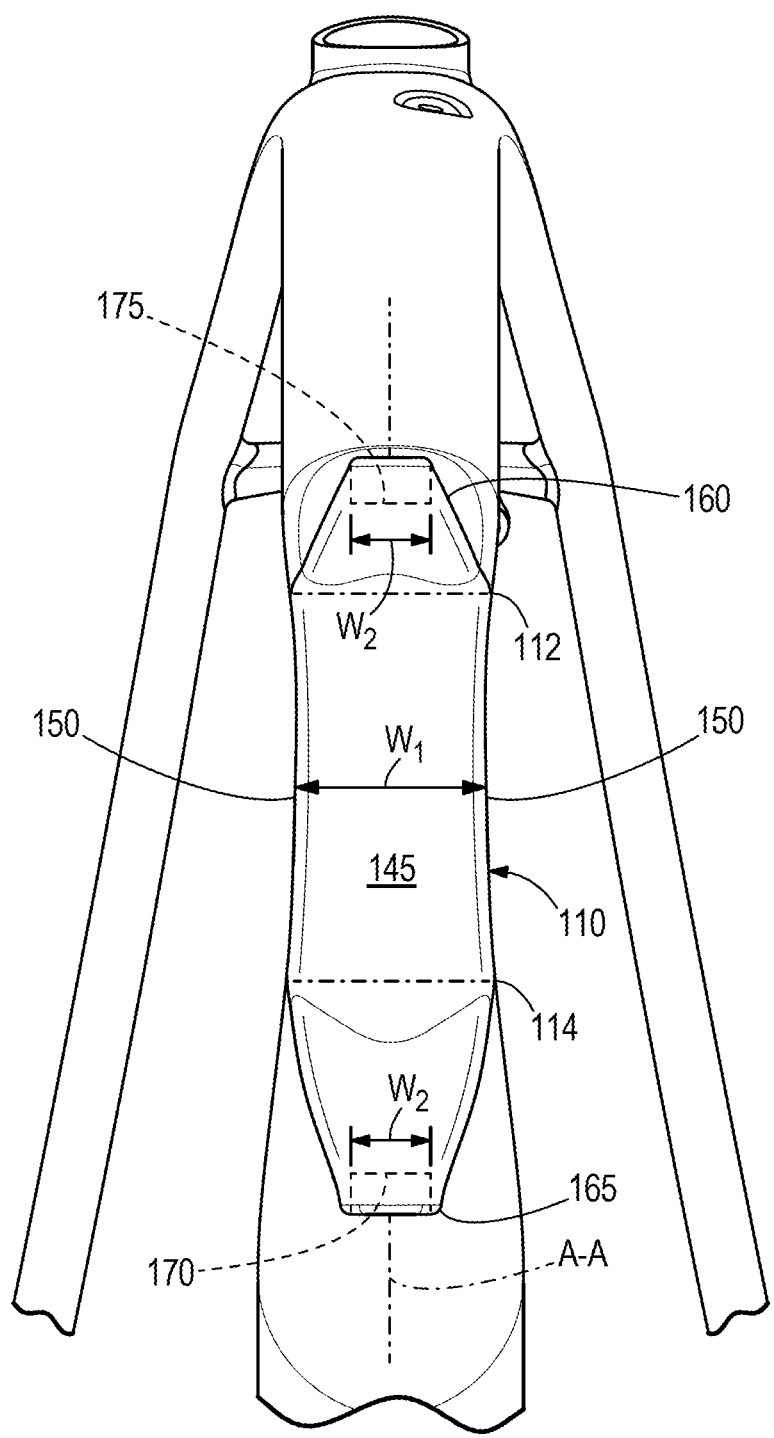
FIG. 14 is a front view of the bicycle frame of FIG. 10 taken perpendicular to the head tube.

Referring to FIG. 14, the head tube 110 includes first and second axial ends 160 and 165. The head tube 110 has a first lateral width W1 taken at a midpoint of the head tube. The width of the head tube 110 narrows from the first lateral width W1 to a second width W2 at the first and second axial ends 160, 165, such that the head tube is generally barrel-shaped. As will be described in greater detail below, the head tube upper and lower ends 160, 165 each define cavities 170, 175 (shown in phantom) that form part of the rotatable connection between the head tube 110 and front fork assembly 135.

The front fork assembly 135 is best seen in FIGS. 1-7. The front fork assembly 135 includes lower and upper supports 180, 185 aligned with the steering axis A-A. The supports 180, 185 rotationally couple the front fork assembly 135 to the head tube 110. A buttress 190 is coupled between the lower and upper supports 180,185 at lower and upper buttress ends 195, 200. A pair of laterally spaced fork legs 205 project downward from the buttress lower end 195. The fork legs 205 are configured to rotationally support a front wheel 12 (see FIG. 3) at a lower end of the fork legs 205, as known in the art.

Figure 2:
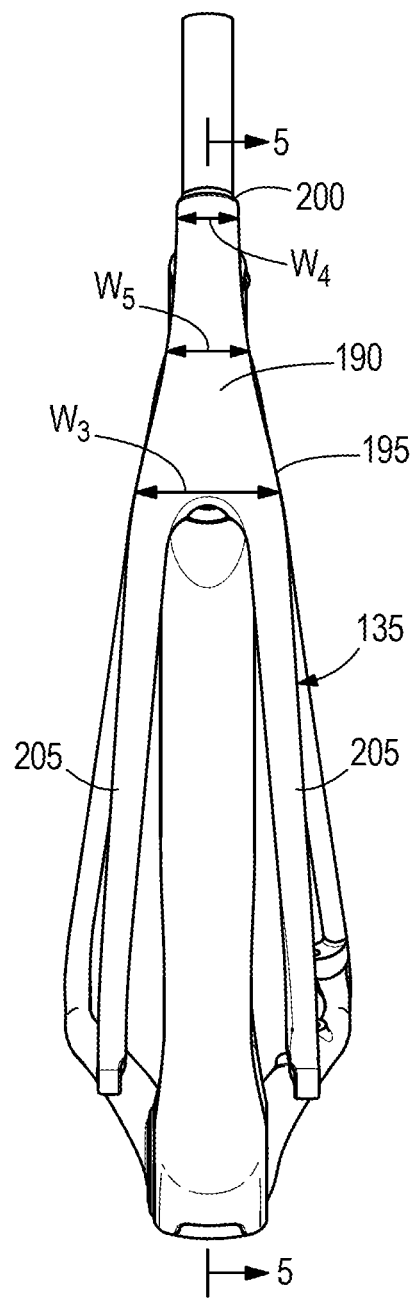
FIG. 2 is a front view of the frame and front fork assembly of FIG. 1.
Figure 7:
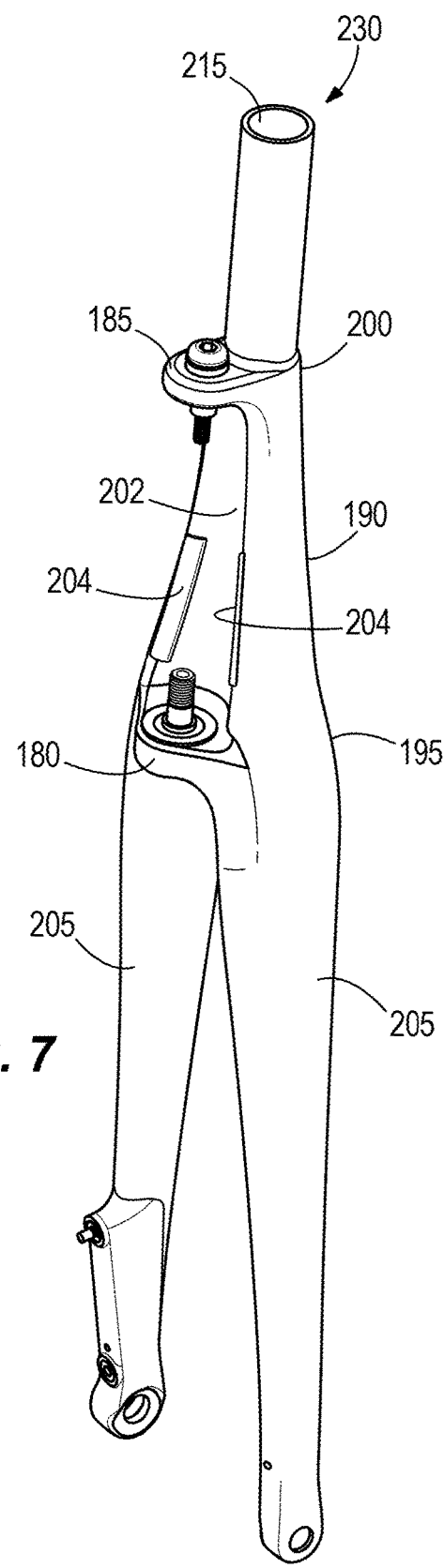
FIG. 7 is a perspective rear view of the front fork assembly of FIG. 1.
Figure 8:
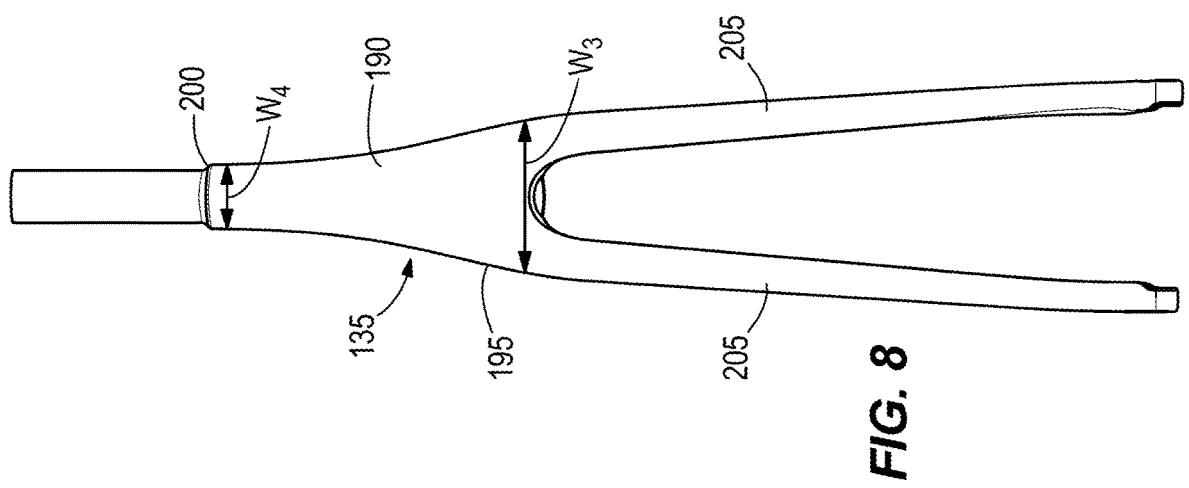
FIG. 8 is a front view of the front fork assembly of FIG. 7.

Referring back to the first embodiment, the buttress 190 is disposed forward of the head tube and steering axis A-A. As best seen in FIGS. 1, 2, and 8, the buttress 190 has a lateral width that tapers from a third width W3 at the buttress lower end 195 to a fourth width W4 at the buttress upper end 200. As illustrated in FIGS. 5, 7 and 8 a steerer tube 215 projects upward from the buttress upper end 200. The lateral width of the buttress 190 tapers from the third width W3, which is approximately equal to a lateral width between exterior side surfaces of the fork legs 205 at the point where the fork legs join the buttress lower end 195, to the fourth width W4 at the buttress upper end 200 where the steerer tube 215 projects from the buttress 190. Stated differently, the third width W3 at the buttress lower end 195 is greater than the fourth width W4 at the buttress upper end 200.

Figure 18:
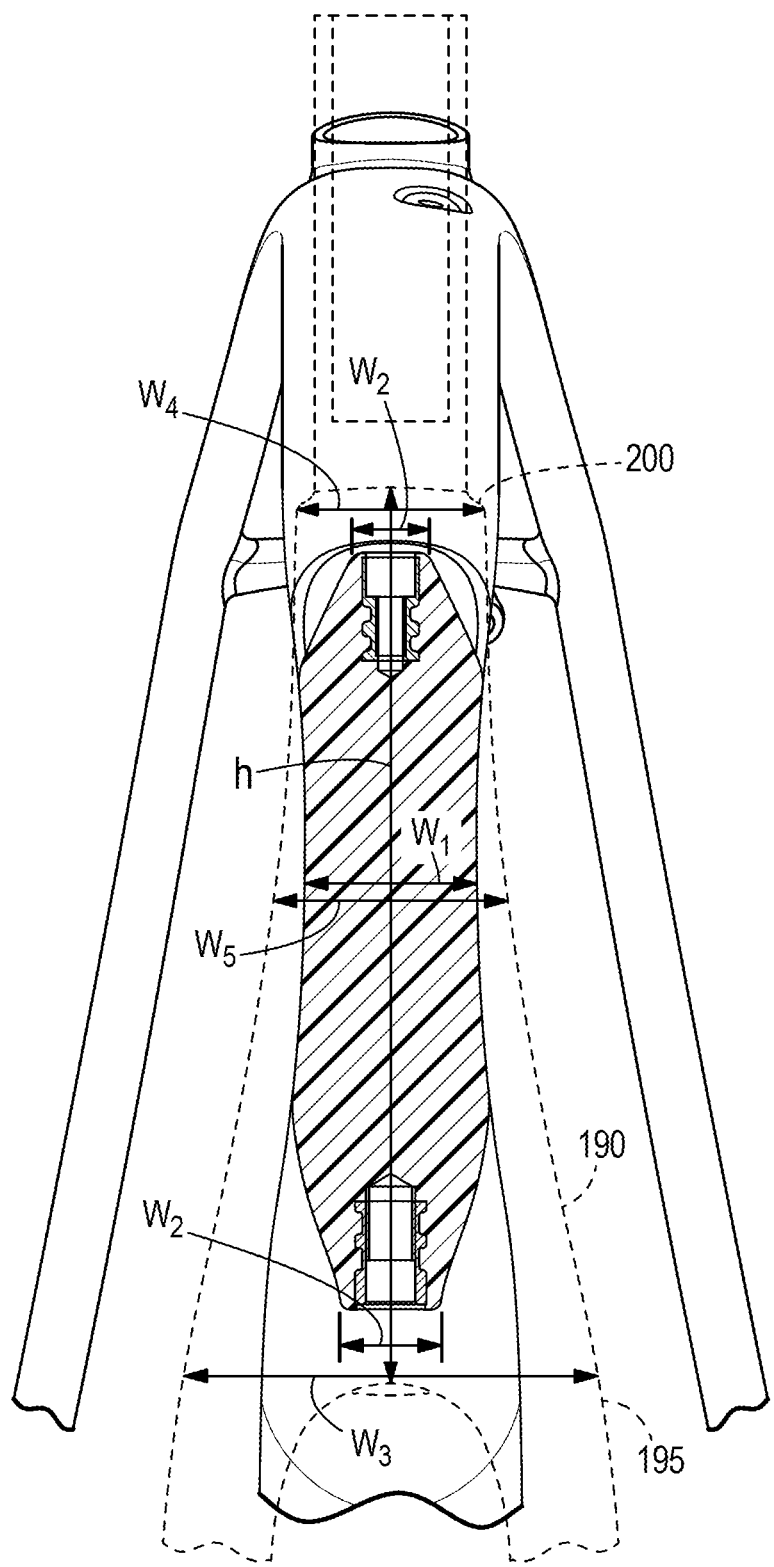
FIG. 18 shows a front section view of the head tube of the bicycle frame of FIG. 14, with the section taken through the steering axis A-A.

As shown in FIGS. 4 and 18, the buttress lateral width begins to taper above the first support 180 and the buttress lateral widths W3, W4 at the lower and upper ends of the buttress are wider than a lateral width W2 of the head tube at both the head tube upper and lower ends 160, 165. The lateral width W3 at the buttress lower end measures between approximately 80 mm and approximately 120 mm, and preferably measures 85 mm. The lateral width W4 at the buttress upper end measures between approximately 30 mm and approximately 50 mm, and preferably measures 35 mm. A fifth lateral width W5 taken at a midpoint of the buttress measures between approximately 40 mm and approximately 60 mm, and preferably measures 48 mm. FIG. 18 shows a section view of the head tube 110 taken at the steering axis A-A, and the buttress 135 is shown in phantom to more clearly show the relationship between the width of the buttress 190 and the width of the head tube 110. With specific reference to FIGS. 2 and 18, the buttress lateral width is wider than the lateral width W1 of the head tube 110 intermediate the buttress lower and upper ends 195, 200. The buttress lateral width tapers gradually between the buttress lower and upper ends 195, 200, such that the lateral width of the buttress along the entire buttress length is wider than the than the corresponding first width W1 of the head tube 110 at the same position along the steering axis A-A, taken at a location laterally aligned with the steering axis A-A when viewed from the side (e.g., the width of the head tube shown in section in FIG. 18). Further, as shown in FIG. 18, the narrowest width of the buttress (e.g., at the upper end of the buttress) is wider than the widest point of the head tube shown in section in FIG. 18. As described in greater detail below, the configuration of the lateral width of the buttress provides enhanced lateral stiffness to the front fork.

The buttress also has a height h (FIG. 18) that varies between approximately 120 mm and 240 mm according to the corresponding length of the head tube which may vary between approximately 90 mm and approximately 230 mm. While the height varies to accommodate a frame of varying sizes, the buttress lateral width tapers approximately linearly between the buttress lower and upper ends 195, 200 such that the widths W3, W4 and W5 remain constant. In other words, the buttress is shaped such that, regardless of the height h of the buttress, the lateral widths of the buttress at the lower end, midpoint, and upper end remain 85 mm, 48 mm, and 35 mm, respectively, in the preferred embodiment.

Figure 17:
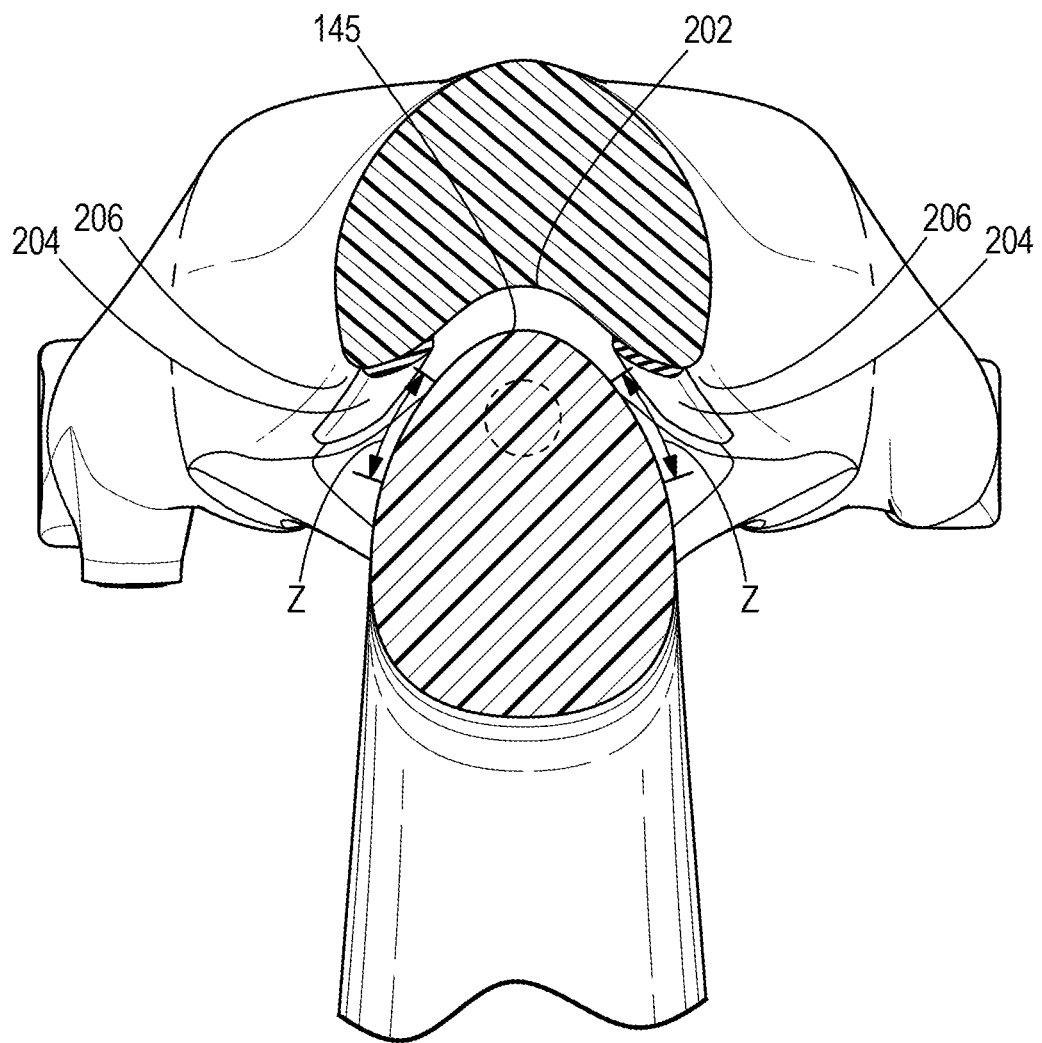
FIG. 17 is a horizontal section view of the frame and front fork assembly taken along line 17-17 of FIG. 3.

Referring to FIG. 5, the buttress also has a fore/aft thickness that tapers from a first thickness T1 at the buttress lower end 195 to a second thickness T2 at the buttress upper end 200. The fore/aft thickness is shaped to provide stiffness in handling in both the fore/aft and lateral directions. Referring to FIGS. 5, 7 and 17, the buttress 190 includes a generally concave trailing portion 202. The size and shape of the trailing portion 202 is configured to receive the nose portion (defined by the front wall 145) of the head tube 110 as shown in FIG. 17 and to allow for rotational movement of the front fork assembly 135 about the head tube 110. The front fork assembly 135 includes a rotational limiting device depicted in FIGS. 7 and 17 as bumpers 204 that are formed from an elastomeric material. The rotational limiting device is configured to prevent damage to the buttress 190 and the head tube 110 in the event that the front fork assembly is rotated such that the buttress collides with the head tube 110. For example, the bumpers 204 are specifically positioned on lateral sides 206 of the trailing portion of the front fork assembly 135 to prevent damage to the left and right sidewalls 150 of the head tube 110 indicated by zone Z (see FIG. 17).

With specific reference to FIG. 5, the steerer tube 215 is disposed forward of and parallel to the steering axis A-A. Additionally, the steerer tube 215 has an outer diameter D1 that is larger than inner diameters D2 of both the cavities 170, 175 of the head tube 110. The steering assembly 14 (FIG. 3) is attached to the steerer tube 215. The steering assembly includes a plurality of spacers 26, the stem 22 and handlebars 20 as is known in the art.

Figure 6:
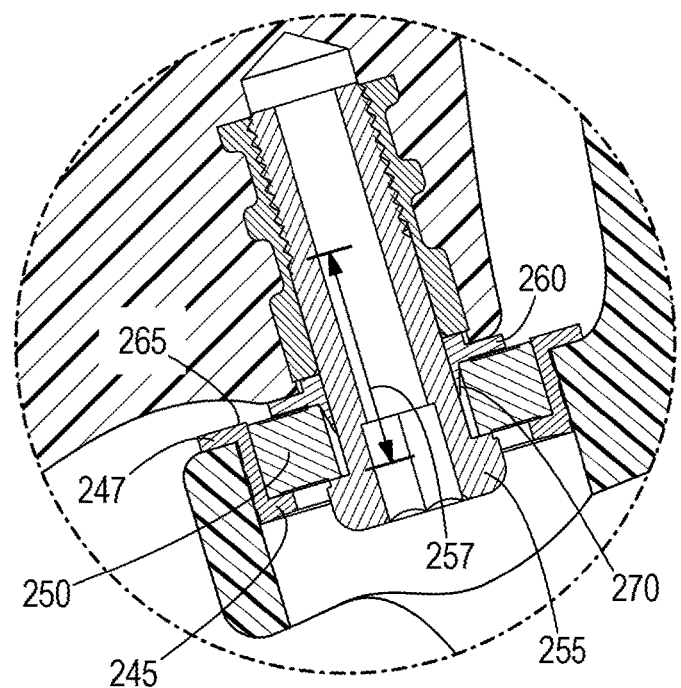
FIG. 6 is an enlargement of the area bounded by the circle 6-6 in FIG. 5.

As best seen in FIGS. 5-6, the first and second cavities 170, 175 each include a wall that defines a female portion 240 (e.g. a threaded hole) of a threaded connector system, while the projections 180, 185 define bearing seats 245 configured to receive a bearing. The bearing seats 245 in the illustrated embodiment each receive a top hat washer 247 that secures a cartridge bearing 250 in the bearing seat 245. Male portions 255 (e.g. bolts) of the threaded connector system are received radially inwardly of the bearings and are coupled to the female portion 240 of the threaded connector system. Accordingly, the male threaded connector portion 255 is fixedly coupled to the female threaded connector portion 240, and the front fork assembly 135 is rotationally coupled to the head tube at the upper and lower supports such that the bearings 250 facilitate rotation of the front fork assembly about the male threaded connector portion 255.

As best seen in FIG. 6, the male threaded connector portion 255 is partially threaded, and a non-threaded portion 257 is positioned inside the bearing. In the illustrated embodiment shown in FIG. 6, washers 260 include a radially oriented portion 265 and an axially oriented portion 270 which has an inclined or wedge-shaped sectional configuration which increases in thickness so as to impart a radially outwardly directed force on the bearing as the male threaded connector portion 255 is secured to the female threaded connector portion 240 of the head tube 110.

Figure 9:
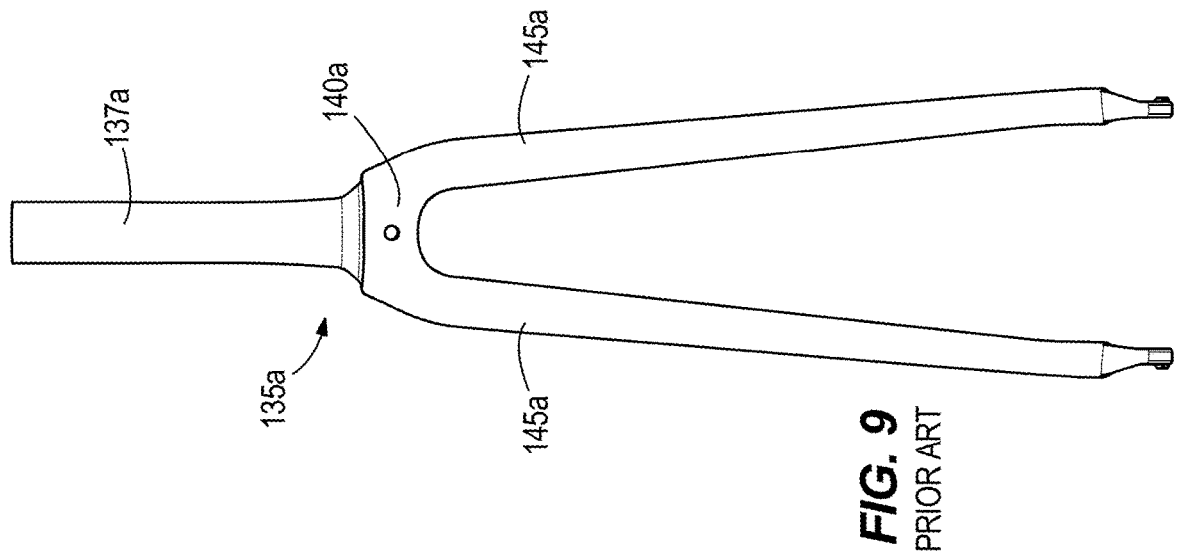
FIG. 9 is a front view of a prior art front fork assembly.

Referring to FIG. 13, a prior art connection between a top tube 105a and a head tube 110a (both shown in phantom) is overlaid on top of the connection between the top tube 105 and the head tube 110 of the present disclosure. Prior art bicycle frames typically have a top tube 105a that increases from a narrower width adjacent the connection between the top tube and seat tube to a wider width adjacent the connection between the top tube and the head tube 110a, since prior art head tubes 110a are sized to accommodate a steerer tube 137a of the front fork 135a (see FIG. 9). The connection between the head tube 110 and the front fork assembly 135 of the present disclosure eliminates the need to accommodate a prior art steerer tube 137a, and accordingly a smaller head tube 110 using less material may be used.

In the present invention, the connection between the head tube 110 and the upper and lower supports 180 and 185 obviates the need to connect the front fork assembly to the head tube by a steerer tube 137a as in the prior art. Accordingly, the buttress 190 can be shaped to have a width that is greater than the head tube 110 between the buttress lower and upper ends 195, 200. The shape of the buttress 190 between the lower and upper ends 195, 200 is tailored to provide increased lateral stiffness to the front fork assembly 135. It is believed that the front fork assembly 135 of FIG. 8 uses less material than the prior art front fork assembly 135a of FIG. 9, since the shape of the buttress 190 contributes to the lateral stiffness to the front fork assembly 135. Stated differently, the lateral stiffness of the front fork assembly 135 is not solely determined by the amount of composite material used. Accordingly, it is believed that the configuration of the buttress 190 of the front fork assembly 135 of the present disclosure provides the same or increased lateral stiffness to the front fork assembly 135 with less material than in the prior art.

Figure 16:
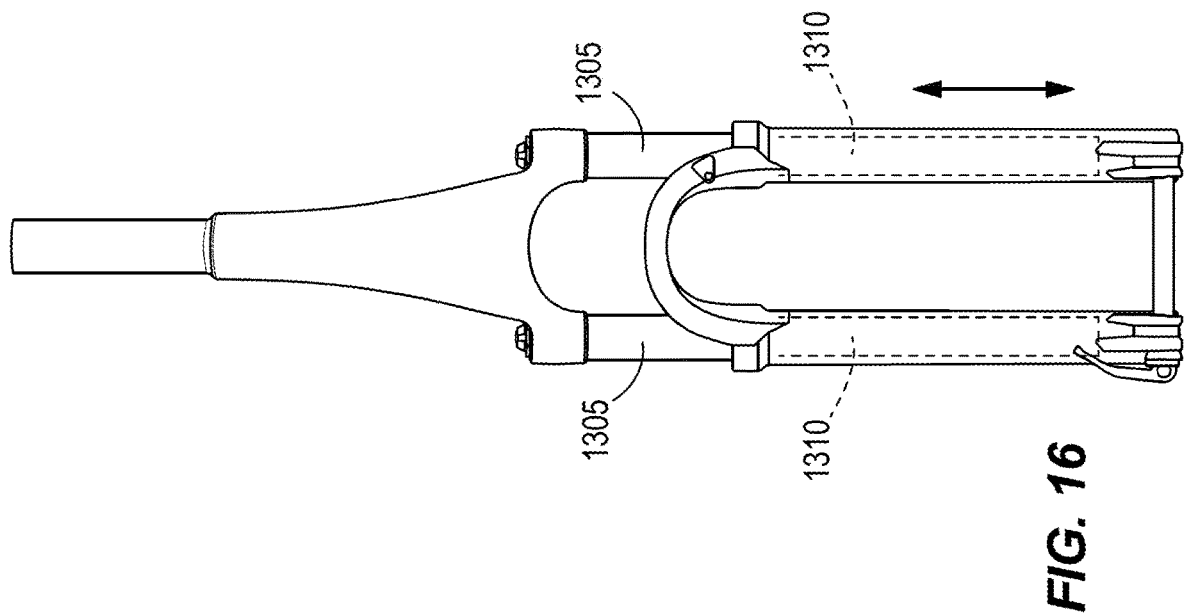
FIG. 16 is a front view of a third embodiment of a front fork assembly of the present invention.
Figure 15:
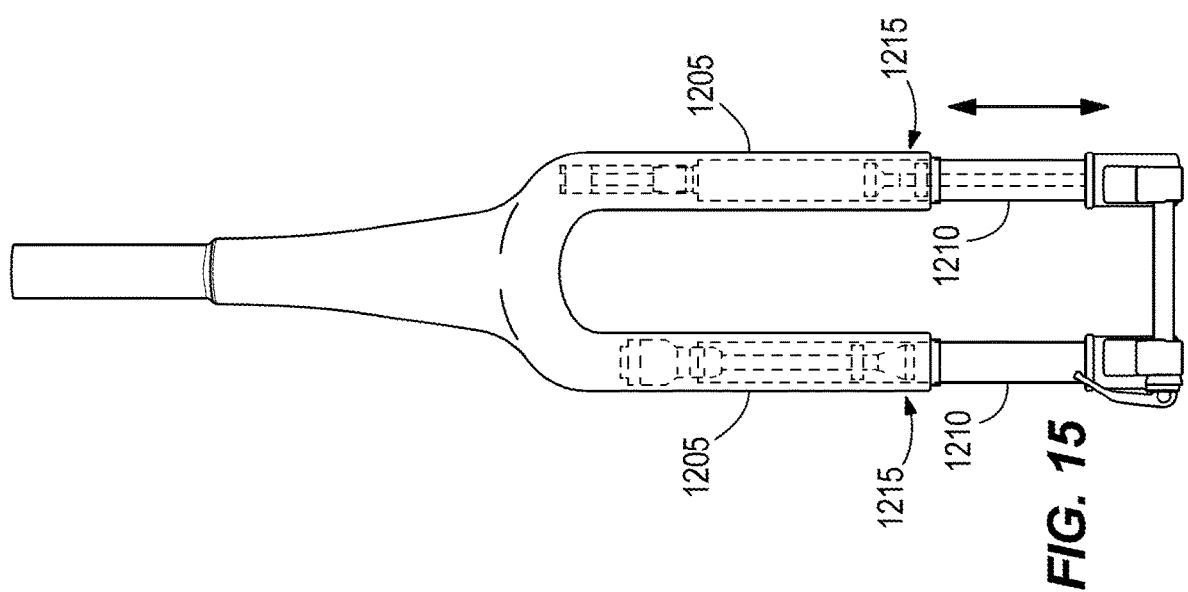
FIG. 15 is a front view of a second embodiment of a front fork assembly of the present invention.

In the embodiment illustrated in FIGS. 15 and 16, the fork legs are modified for use in a front fork suspension assembly commonly used in connection with mountain bikes and other bicycles intended for use on rugged, uneven terrain. In the embodiment shown, in FIG. 15, the fork legs 1205 comprise hollow tubular members that receive a pair of stanchions 1210, and a suspension system 1215 (shown in phantom) including a spring and a damping member are disposed in one or both of the fork legs 1205 as known in the art. In FIG. 16 the configuration is reversed such that the fork legs 1305 have a smooth outer surface which is received by a hollow tubular slider 1310. Accordingly, the front fork assembly is contemplated for use with bicycles having a rigid front fork assembly such as road bicycles, and also for bicycles having a front fork suspension such as mountain bikes.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A bicycle comprising:
   a frame assembly including a head tube defining a steering axis; and
   a front fork assembly coupled to the head tube for rotation about the steering axis, the front fork assembly including:
      an upper support and a lower support aligned with the steering axis and rotationally coupling the front fork assembly to the head tube;
      a buttress coupled to the upper support at an upper buttress end such that the upper buttress end is aligned with an upper end of the head tube and to the lower support at a lower buttress end such that the lower buttress end is aligned with a lower end of the head tube; and
      at least one fork leg projecting from the lower buttress end at an upper end of the at least one fork leg and being configured to rotationally support a wheel at a lower end of the at least one fork leg;
   wherein the buttress is disposed forward of the head tube and a portion of the buttress above the lower support has a first lateral width nearer to the lower buttress end than the upper buttress end and has a second lateral width nearer to the upper buttress end than the lower buttress end, and the first lateral width is greater than the second lateral width.

2. The bicycle of claim 1, wherein the front fork assembly includes a pair of laterally spaced fork legs, and the first lateral width is approximately equal to a lateral width between exterior surfaces of the pair of laterally spaced fork legs at upper ends of the pair laterally of spaced fork legs.

3. The bicycle of claim 2, wherein a buttress lateral width of the buttress begins to taper above the lower support and the first lateral width and the second lateral width are wider than lateral widths of the head tube at the upper end of the head tube and the lower end of the head tube.

4. The bicycle of claim 1, wherein a buttress lateral width of the buttress is wider than a lateral width of the head tube at the lower buttress end and the buttress gradually tapers.

5. The bicycle of claim 4, wherein the buttress has a lateral width at a midpoint between the upper buttress end and the lower buttress end that is greater than the lateral width of the head tube.

6. The bicycle of claim 1, wherein the upper support defines an upper seat configured to receive an upper bearing and the lower support defines a lower seat configured to receive a lower bearing.

7. The bicycle of claim 6, wherein the head tube defines a first cavity configured to receive a first connector and a second cavity configured to receive a second connector, and the first connector and the second connector rotationally couple the buttress to the head tube at the upper support and the lower support, and a steerer tube projects from the upper buttress end.

8. The bicycle of claim 7, wherein an outer diameter of the steerer tube is larger than a first diameter of the first cavity and a second diameter of the second cavity.

9. The bicycle of claim 7, wherein a longitudinal axis of the steerer tube is disposed forward of the steering axis.

10. The bicycle of claim 1, wherein the buttress has a leading portion that faces away from the frame assembly and a generally concave trailing portion that faces toward the frame assembly.

11. The bicycle of claim 10, further comprising at least one rotational limiting device connected to the buttress at the generally concave trailing portion and configured to prevent the generally concave trailing portion from contacting the head tube when the front fork assembly is rotated clockwise or counterclockwise about the steering axis.

12. A bicycle comprising:
   a frame assembly including a head tube connected to a top tube and a down tube, the head tube defining a steering axis and including a pair of sidewalls and a front wall, wherein the head tube is configured such that the steering axis is eccentrically defined within the head tube, closer to the front wall than to the pair of sidewalls; and
   a front fork assembly rotationally coupled to the head tube for rotation about the steering axis.

13. The bicycle of claim 12, wherein the head tube includes a first axial end and a second axial end and wherein the head tube narrows from a first width between the first axial end and the second axial end to a second width adjacent the first axial end and to the second width adjacent to the second axial end such that the head tube is generally barrel-shaped.

14. The bicycle of claim 13, wherein the front fork assembly further comprises a steerer tube having a width that is greater than the second width.

15. The bicycle of claim 12, wherein the front fork assembly further comprises an upper support and a lower support, the upper support and the lower support being aligned with the steering axis and rotationally coupling the front fork assembly to the head tube.

16. The bicycle of claim 15, wherein the upper support defines a first seat sized to receive an upper bearing and the lower support defines a second seat sized to receive a lower bearing.

17. The bicycle of claim 12, wherein the head tube narrows towards the front wall such that the head tube has a bullet-nosed sectional shape.

18. A bicycle comprising:
   a frame assembly including a head tube connected to a top tube and a down tube, the head tube defining a steering axis; and
   a front fork assembly coupled to the head tube for rotation about the steering axis, including a buttress coupled to the head tube at a buttress upper end and a buttress lower end, at least one fork leg projecting from the buttress lower end at an upper end of the fork leg and configured to rotationally support a wheel at a lower end of the fork leg;
   wherein the buttress has a lateral width that tapers from a first lateral width at the buttress lower end to a second lateral width at the buttress upper end, and the buttress is shaped such that the buttress is comparatively wider than a lateral width of the head tube in a plane perpendicular to the steering axis.

19. The bicycle of claim 18, wherein the lateral width of the head tube narrows adjacent an upper end of the head tube and a lower end of the head tube.

20. The bicycle of claim 19, wherein the head tube is substantially barrel shaped in cross-section at the steering axis.

* * * * *